United States Patent
Moguel et al.

(10) Patent No.: US 10,581,689 B2
(45) Date of Patent: Mar. 3, 2020

(54) THIRD-PARTY NETWORK COMPUTATIONAL RESOURCE UTILIZATION

(71) Applicant: ServiceNow, Inc., Santa Clara, CA (US)

(72) Inventors: Adam Wesley Moguel, Santa Clara, CA (US); Chanwook Kim, San Jose, CA (US); Vani Banaji, Saratoga, CA (US); Cheng Liu, Sunnyvale, CA (US); Shravan Kalsanka Pai, Amsterdam (NL); Chinmayee Nagaraju, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 75 days.

(21) Appl. No.: 15/907,065

(22) Filed: Feb. 27, 2018

(65) Prior Publication Data
US 2019/0268231 A1    Aug. 29, 2019

(51) Int. Cl.
| | | |
|---|---|---|
| *H04L 29/06* | (2006.01) | |
| *H04L 12/24* | (2006.01) | |
| *H04L 12/911* | (2013.01) | |
| *H04L 12/26* | (2006.01) | |
| *H04L 12/927* | (2013.01) | |

(52) U.S. Cl.
CPC .......... *H04L 41/0893* (2013.01); *H04L 43/06* (2013.01); *H04L 43/0876* (2013.01); *H04L 47/78* (2013.01); *H04L 47/808* (2013.01); *H04L 41/0213* (2013.01); *H04L 41/22* (2013.01)

(58) Field of Classification Search
CPC .................................................... H04L 41/0893
See application file for complete search history.

(56) References Cited

U.S. PATENT DOCUMENTS

| | | | |
|---|---|---|---|
| 2014/0207918 A1* | 7/2014 | Kowalski | ............ H04L 41/0803 709/220 |
| 2017/0264480 A1* | 9/2017 | Delegard | .............. H04L 41/082 |

\* cited by examiner

*Primary Examiner* — Adnan M Mirza
(74) *Attorney, Agent, or Firm* — Fletcher Yoder, P.C.

(57) ABSTRACT

A computing system disposed within a computational instance of a remote network management platform remotely manages a managed network that uses computational resources of a third-party network to deploy operations. The computing system may obtain a utilization policy that identifies (i) particular computational resources of the third-party network used to deploy a particular operation and (ii) a time period during which the particular computational resources can be used. The computing system may be configured to: obtain a utilization report that identifies (i) the computational resources used to deploy the operations and (ii) times at which the computational resources were used; determine that the particular computational resources deployed the particular operation outside the time period identified by the utilization policy; generate a report indicating that the particular computational resources deployed the particular operation outside the time period; and provide the report to the managed network.

20 Claims, 15 Drawing Sheets

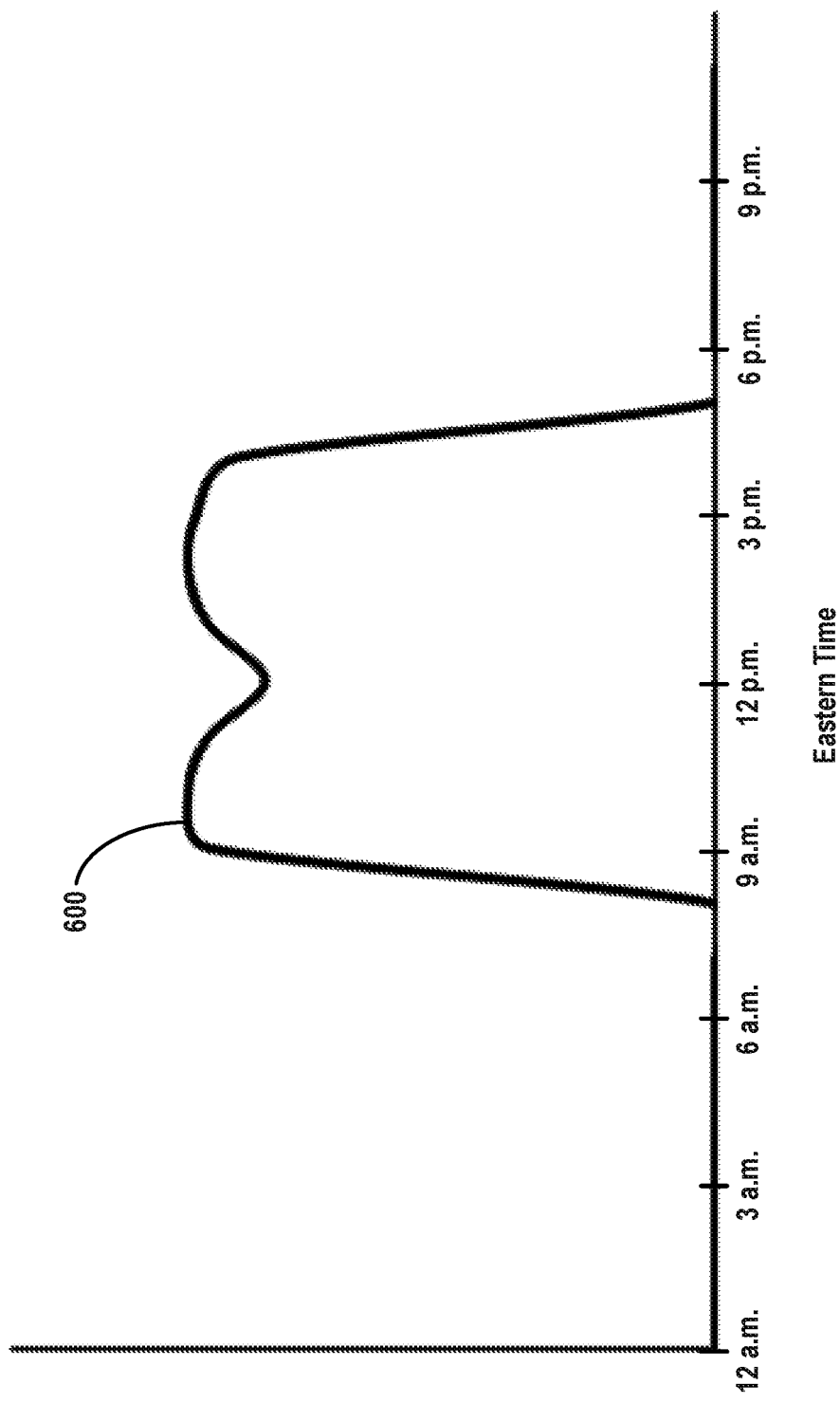

| Item # | Item Description | Usage Type | Usage Qty | Rate | Cost | Usage Start | Usage End | Region | Service Type |
|---|---|---|---|---|---|---|---|---|---|
| 133 | Hourly Storage Fee per TB | TimedStorage | 500 | $0.033 | $16.500 | 1/1/18 12:00 | 1/1/18 13:00 | us-west | MusicStreaming |
| 134 | Data Transfer Fee per GB | DataTransferOut | 27 | $0.085 | $2.295 | 1/1/18 12:00 | 1/1/18 13:00 | us-west | MusicStreaming |
| 135 | Hourly Fee for Resource Use | CPU.large | 1 | $0.093 | $0.093 | 1/1/18 12:00 | 1/1/18 13:00 | us-west | MusicStreaming |
| 136 | Hourly Fee for Resource Use | CPU.large | 1 | $0.093 | $0.093 | 1/1/18 12:00 | 1/1/18 13:00 | us-west | MusicStreaming |
| 137 | Hourly Fee for Resource Use | CPU.large | 1 | $0.093 | $0.093 | 1/1/18 12:00 | 1/1/18 13:00 | us-west | MusicStreaming |
| 138 | Hourly Fee for Resource Use | CPU.large | 1 | $0.093 | $0.093 | 1/1/18 12:00 | 1/1/18 13:00 | us-west | MusicStreaming |
| 139 | Hourly Fee for Resource Use | CPU.large | 1 | $0.093 | $0.093 | 1/1/18 12:00 | 1/1/18 13:00 | us-west | MusicStreaming |
| 140 | Hourly Fee for Resource Use | CPU.small | 1 | $0.023 | $0.023 | 1/1/18 12:00 | 1/1/18 13:00 | us-east | WebDevelopment |
| 141 | Hourly Fee for Resource Use | CPU.small | 1 | $0.023 | $0.023 | 1/1/18 12:00 | 1/1/18 13:00 | us-east | WebDevelopment |
| 142 | Hourly Fee for Resource Use | CPU.small | 1 | $0.023 | $0.023 | 1/1/18 12:00 | 1/1/18 13:00 | us-east | WebDevelopment |
| 143 | Hourly Fee for Resource Use | CPU.small | 1 | $0.023 | $0.023 | 1/1/18 12:00 | 1/1/18 13:00 | us-east | WebDevelopment |
| ... | | | | | | | | | |
| 199 | Hourly Storage Fee per TB | TimedStorage | 500 | $0.033 | $16.500 | 1/1/18 18:00 | 1/1/18 19:00 | us-west | MusicStreaming |
| 200 | Data Transfer Fee per GB | DataTransferOut | 79 | $0.085 | $6.715 | 1/1/18 18:00 | 1/1/18 19:00 | us-west | MusicStreaming |
| 201 | Hourly Fee for Resource Use | CPU.large | 1 | $0.093 | $0.093 | 1/1/18 18:00 | 1/1/18 19:00 | us-west | MusicStreaming |
| 202 | Hourly Fee for Resource Use | CPU.large | 1 | $0.093 | $0.093 | 1/1/18 18:00 | 1/1/18 19:00 | us-west | MusicStreaming |
| 203 | Hourly Fee for Resource Use | CPU.large | 1 | $0.093 | $0.093 | 1/1/18 18:00 | 1/1/18 19:00 | us-west | MusicStreaming |
| 204 | Hourly Fee for Resource Use | CPU.large | 1 | $0.093 | $0.093 | 1/1/18 18:00 | 1/1/18 19:00 | us-west | MusicStreaming |
| 205 | Hourly Fee for Resource Use | CPU.large | 1 | $0.093 | $0.093 | 1/1/18 18:00 | 1/1/18 19:00 | us-west | MusicStreaming |
| 206 | Hourly Fee for Resource Use | CPU.small | 1 | $0.023 | $0.023 | 1/1/18 18:00 | 1/1/18 19:00 | us-east | WebDevelopment |
| 207 | Hourly Fee for Resource Use | CPU.small | 1 | $0.023 | $0.023 | 1/1/18 18:00 | 1/1/18 19:00 | us-east | WebDevelopment |
| 208 | Hourly Fee for Resource Use | CPU.small | 1 | $0.023 | $0.023 | 1/1/18 18:00 | 1/1/18 19:00 | us-east | WebDevelopment |
| 209 | Hourly Fee for Resource Use | CPU.small | 1 | $0.023 | $0.023 | 1/1/18 18:00 | 1/1/18 19:00 | us-east | WebDevelopment |
| ... | | | | | | | | | |

THIRD-PARTY NETWORK COMPUTATIONAL RESOURCE UTILIZATION

BACKGROUND

In order to avoid building and maintaining its own servers, an enterprise may use a third-party network to deploy various applications and services to the enterprise's employees, clients, and customers. For instance, the enterprise may use on-demand computational resources from the third-party network, or the enterprise may reserve the resources in advance. When using on-demand computational resources, the enterprise might not be doing so in the most efficient fashion. For instance, the enterprise may find itself needlessly allocating computational resources that are unwanted or unnecessary.

SUMMARY

The embodiments herein overcome the aforementioned limitations by identifying when an enterprise is utilizing unwanted or unnecessary computational resources of a third-party network. For instance, as part of its operations, an enterprise may use third-party computing resources to provide a web application that is accessible twenty-four hours a day, seven days a week, and the enterprise may also use third-party computing resources for testing, maintaining, and/or developing such a web application. The resources for testing, maintaining, and/or developing the web application might be used mostly or exclusively during the enterprise's hours of operation because this might be when enterprise's web developers access the third-party resources for performing such tasks. Accordingly, the enterprise may want to limit its reservation of third-party resources for web development tasks to a time period that corresponds to the enterprise's operating hours.

To facilitate this, the enterprise may specify a policy for identifying which computational resources are permitted to be used at various times throughout a given time period (e.g., a day or a week). For instance, in the example above, the policy may specify that computing resources flagged for web development use are permitted to be used only during the enterprise's operational hours. The third-party network may provide a utilization report that identifies which computational resources are used by the enterprise and when they are used. By cross-referencing the policy with the utilization report, computing resources that do not comply with the policy may be identified to the enterprise, and the identified computing resources may be disabled.

Using a utilization policy and a utilization report as described herein may provide a number of technical improvements including, but not limited to, reducing the amount of computing resources that are allocated for use by the enterprise but are likely to remain idle, dynamically reacting to a changing computing demand curve, and providing a comprehensive view of third-party resource utilization that cannot be obtained directly from reports (e.g., billing records) that the enterprise might receive from the third-party network.

Accordingly, a first example embodiment may involve a computing system disposed within a computational instance of a remote network management platform that remotely manages a managed network. The managed network may use a third-party network to deploy one or more operations using computational resources of the third-party network. The computing system may determine a utilization policy on behalf of the managed network. The utilization policy may identify (i) particular computational resources of the third-party network used to deploy a particular operation of the one or more operations and (ii) a time period during which the third-party network can use the particular computational resources to deploy the particular operation. The computing system may obtain from the third-party network a utilization report that identifies (i) the computational resources used to deploy the one or more operations and (ii) times at which the computational resources deployed the one or more operations. The computing system may determine, based on the utilization report, that the particular computational resources identified by the utilization policy deployed the particular operation outside the time period identified by the utilization policy. The computing system may generate a report indicating that the particular computational resources identified by the utilization policy deployed the particular operation outside the time period identified by the utilization policy, and the computing system may provide the report to the managed network.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6A is a graph depicting computational demand over time for web development services, in accordance with example embodiments.

FIG. 8 depicts a third-party network utilization report, in accordance with example embodiments.

DETAILED DESCRIPTION

Figure 1:
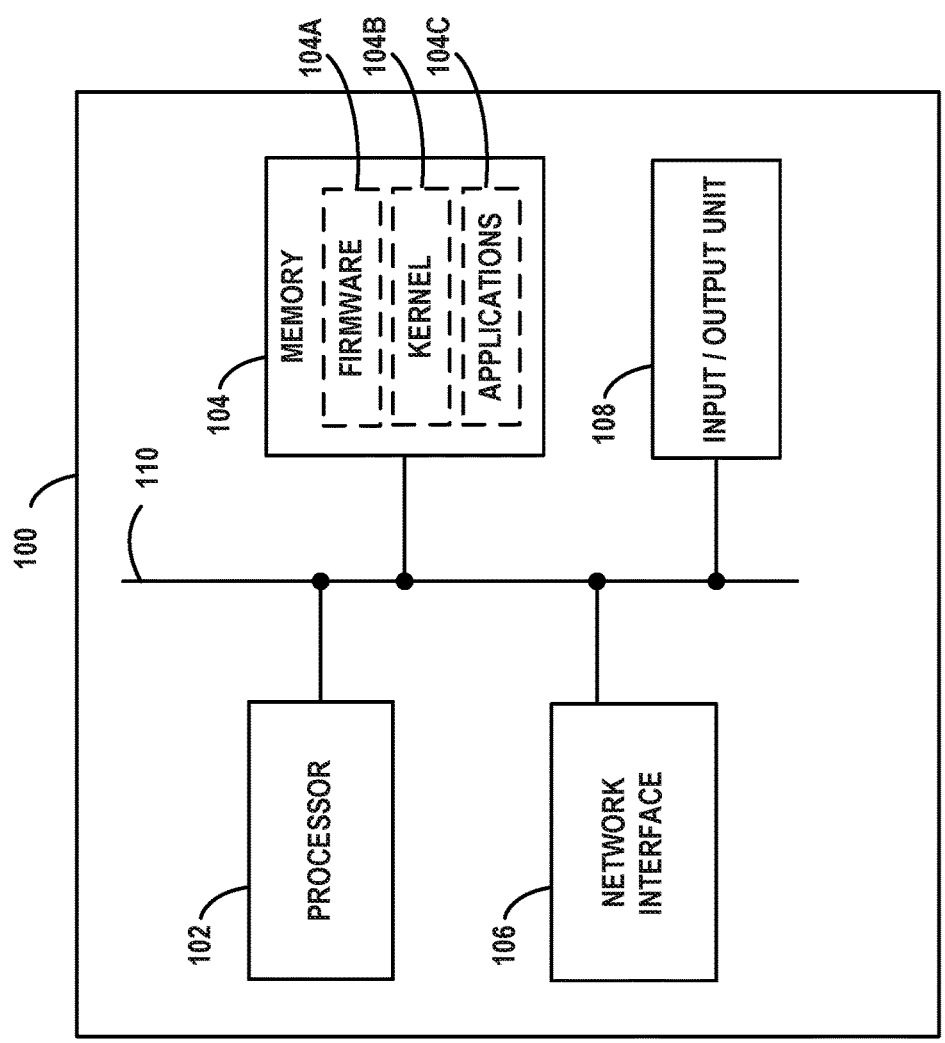
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
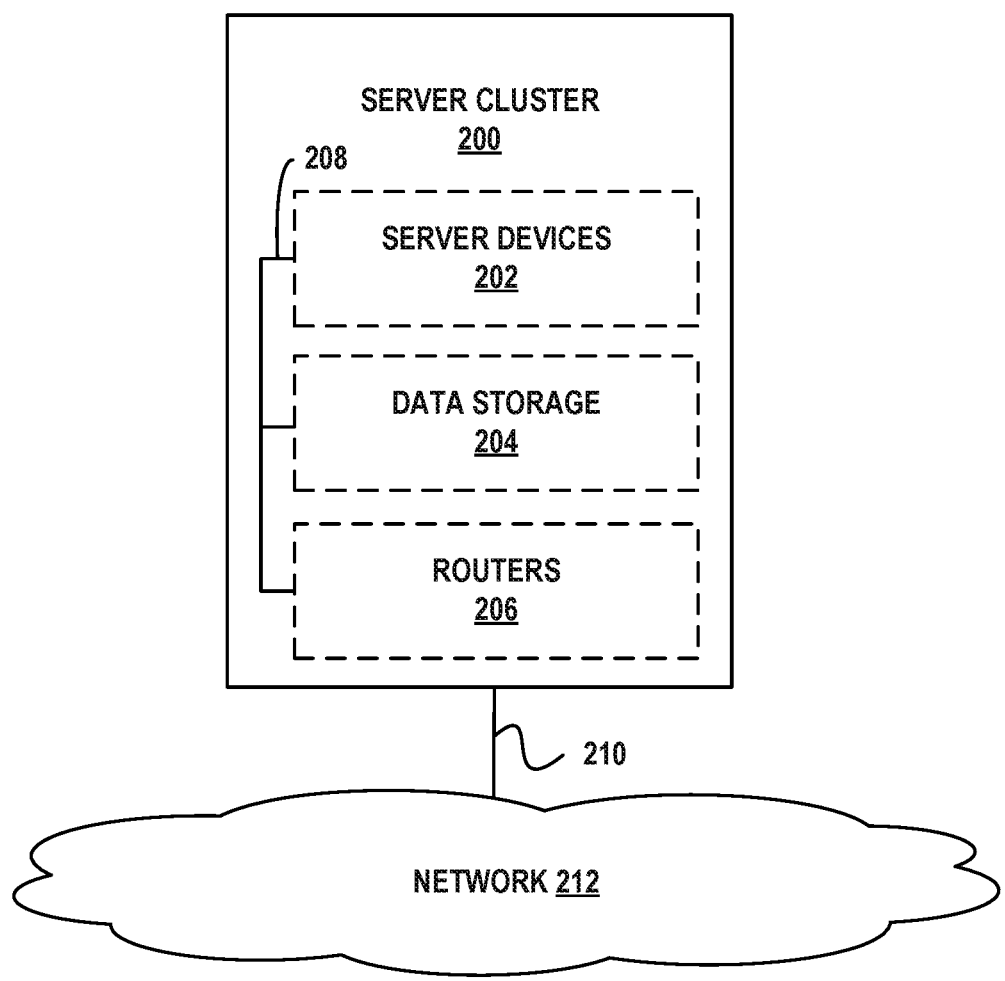
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
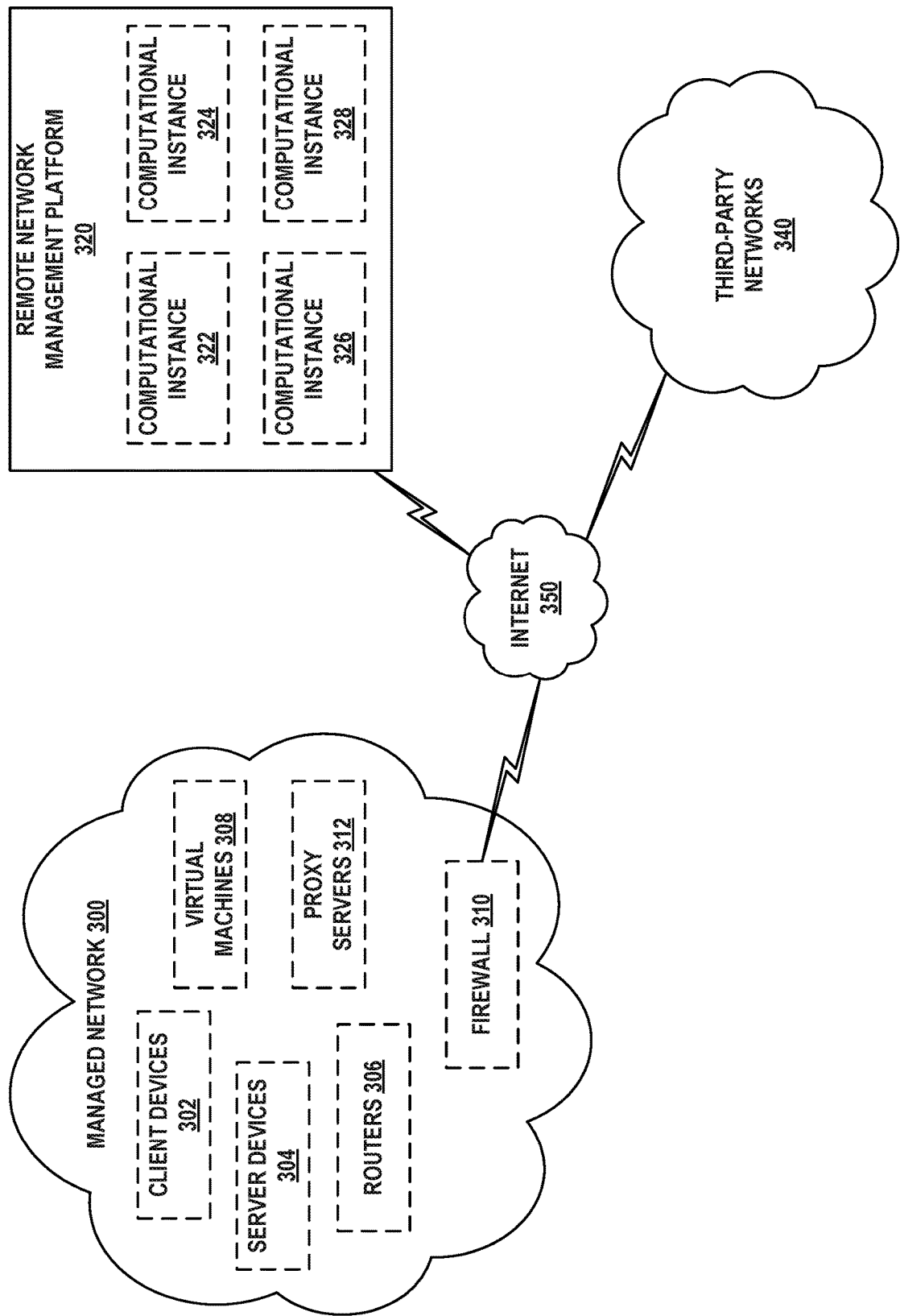
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® (referred to herein as "AWS"), MICROSOFT® Azure (referred to herein as "Azure"), and GOOGLE® Cloud Platform (referred to herein as "GCP"). Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
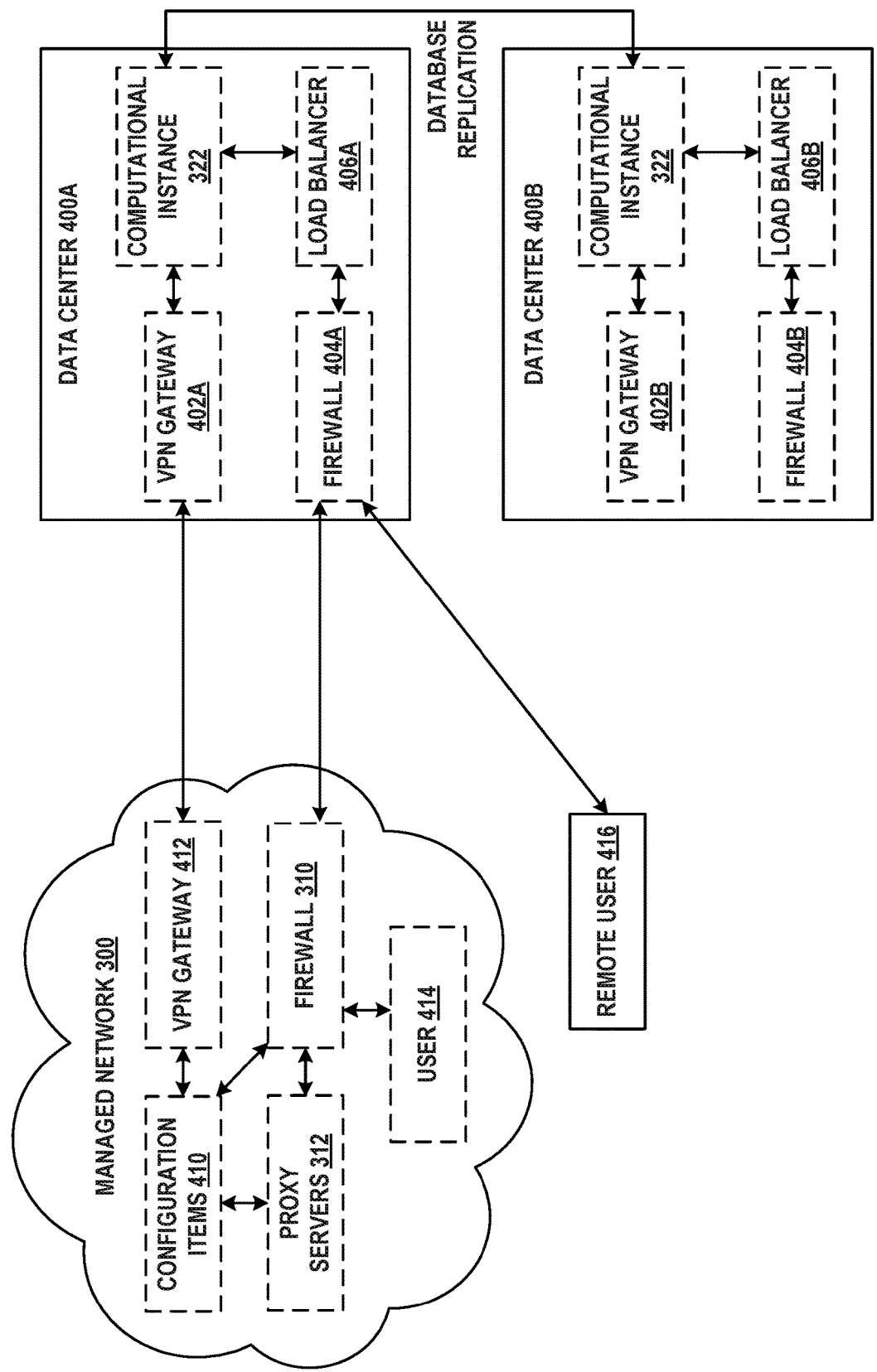
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
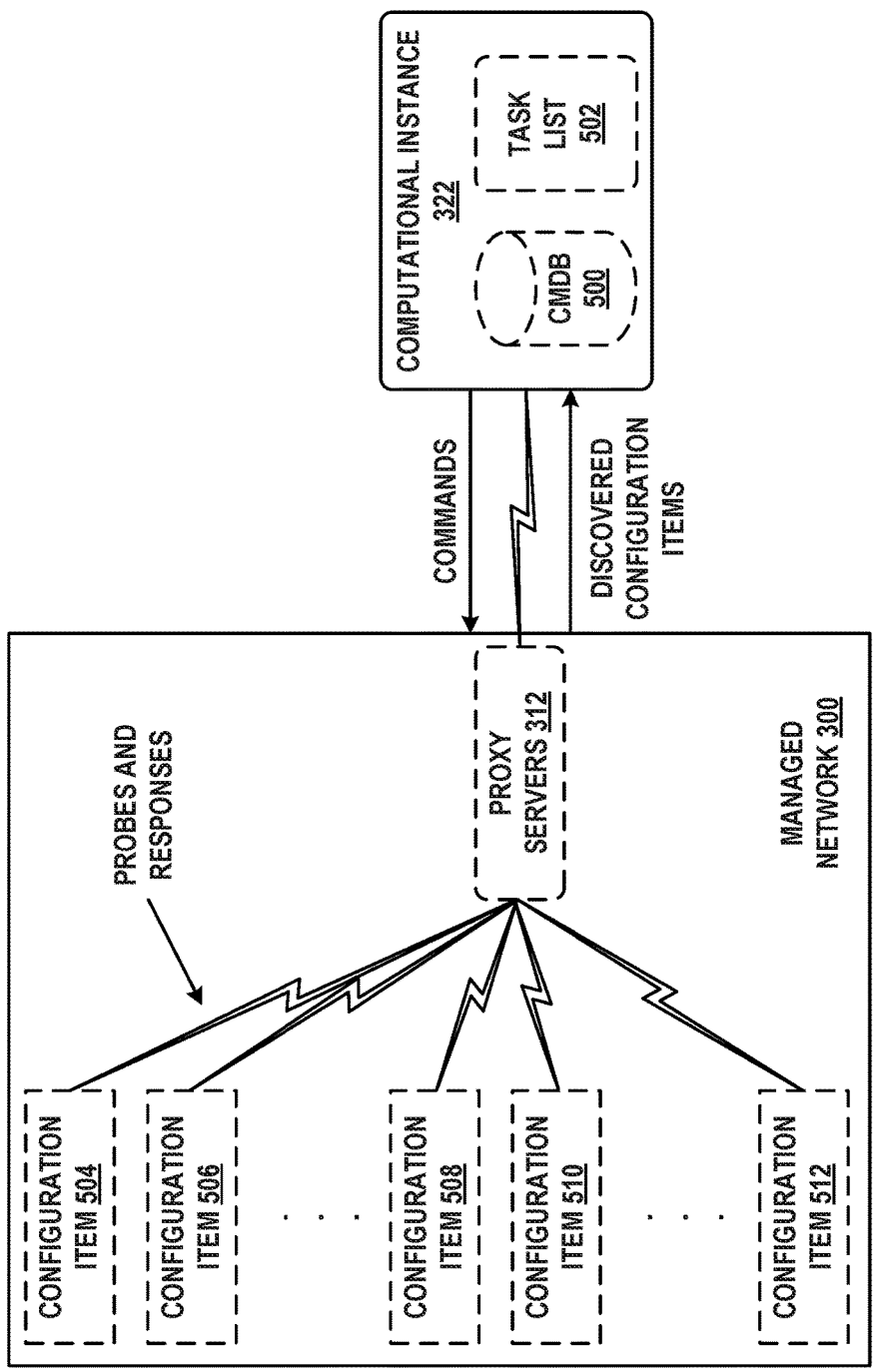
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
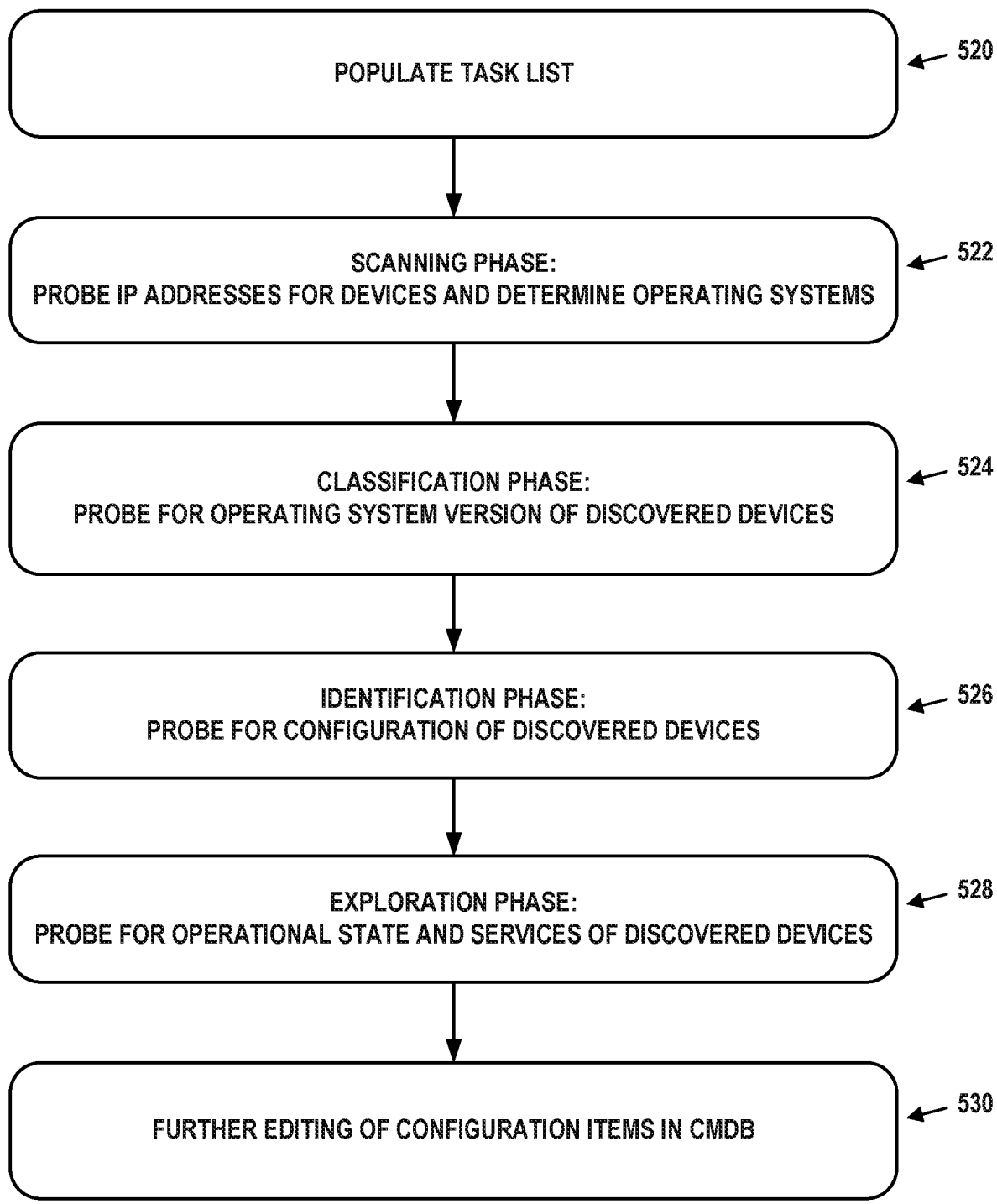
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. THIRD-PARTY NETWORK COMPUTATIONAL RESOURCE UTILIZATION

As noted above, a managed network may use a third-party network, such as AWS, Azure, or GCP, to deploy applications or services to its clients and customers. In order to facilitate this, the third-party network can make available various computing resources for the managed network. Examples of such computing resources may include processing power, data storage, and networking services, to name a few.

The managed network may use the third-party network's computing resources in an on-demand fashion or by reserving the resources in advance. In order to use the resources on demand, the managed network may enable certain ones of the third-party network's resources, and the third-party network may monitor the managed network's usage of the enabled resources. The third-party network may then bill the managed network according to the extent which the managed network has utilized the resources. For instance, the third-party may bill the managed network based on an amount of time that the managed network uses the resources and/or based on a quantity of the resources used. The manner in which the third-party network measures the quantity of the resources may vary for different types of resources. For instance, when the managed network uses the third-party network for processing power, the quantity of resources may include a measure of a number of processor cores used, and when the managed network uses the third-party network for data storage, the quantity of resources may include a measure of the amount of data (e.g., in megabytes, gigabytes, terabytes, etc.) stored by the third-party network.

The managed network's need for the third-party network's computing resources may vary depending on the time of day. For instance, the managed network may only require access to certain resources during its normal hours of operation, and/or the managed network may require additional or fewer resources at any given time depending on how customer/client demand fluctuates throughout the day. As such, in order to avoid unwanted costs due to unnecessary on-demand usage of the third-party network's computing resources, the managed network may want to monitor and/or limit its use of the third-party network's computing resources. As explained in further detail below, in order to facilitate this, the managed network can specify times when certain computing resources should be used, and the remote network management platform that manages the managed network can identify when any computing resources are used outside their specified times and report the identification to the managed network.

As noted above, an example managed network may use a third-party network to provide online music streaming services. For illustrative purposes, the following examples will be described with respect to such a managed network that provides online music streaming services. However, it will be readily understood that the concepts described herein can be applied to any managed network that uses a third-party network to deploy services other than those related to online music streaming.

A managed network that provides online music streaming services to music listeners may use a third-party network to store music files and to provide web interface and streaming capabilities. The managed network may only use some of the third-party network's resources during business hours. For instance, in order to maintain and improve its web interface, the managed network may use the third-party networks resources to perform various web development tasks. Such web development tasks may be carried out during the managed network's normal working hours by developers of the managed network, and the web development tasks may stop when the developers leave work at the end of the day.

FIG. 6A depicts a graph showing a curve 600 representative of a computational demand resulting from the web development tasks carried out by the managed network's developers throughout a given day. The computational demand may be for various types of computing resources, such as processing power, data storage, or networking services.

In the present example, the managed network may be based in the Eastern Time Zone of the United States such that the managed network's web developers may also be physically present in the Eastern Time Zone when performing web development services, and so FIG. 6 displays computational demand curve 600 with respect to U.S. Eastern Time. The managed network's developers may begin working at around 8:00 a.m. and may stop working at around 5:00 p.m. Accordingly, computational demand curve 600 is shown spiking upwards between 8:00 a.m. and 9:00 a.m. and spiking downwards between 4:00 p.m. and 5:00 p.m. The computational demand otherwise remains fairly consistent throughout the day with a small dip around the lunch hour.

In order to meet the computational demand represented by curve 600, the managed network may obtain access to various computing resources of the third-party network. Depending on the type of computational demand represented by curve 600, the managed network may use different types of resources provided by the third-party network, including computer processing resources, data storage resources, or networking resources.

Figure 6B:
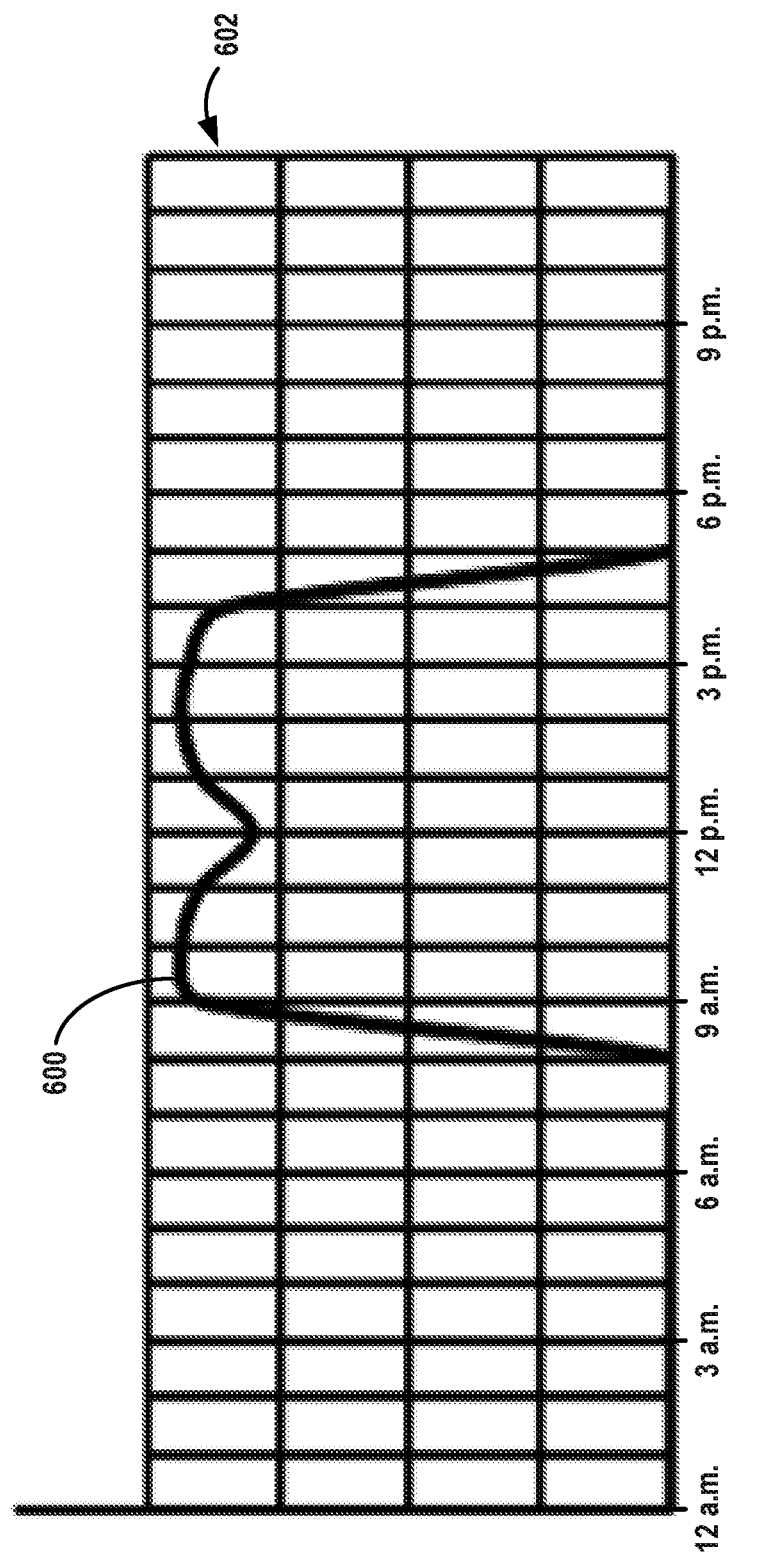
FIG. 6B is the graph of FIG. 6A further depicting blocks of computing resources of a third-party network for carrying out the web development services, in accordance with example embodiments.

FIG. 6B depicts a graph showing a number of computing resource blocks 602, each resource block 602 representing a particular quantity of computing resources provided by the third-party network to the managed network in order to carry out the web development tasks corresponding to computational demand curve 600. In one example, the third-party network's computing resources may include computer processing capabilities, and each resource block 602 may represent use of a particular processor or set of processors of the third-party network.

As shown, resource blocks 602 each have a duration of one hour. This is because third-party networks, such as AWS, Azure, or GCP, may monitor usage of their computing resources with hourly granularity. However, resource blocks 602 may have shorter or longer durations in examples where the third-party network monitors resource usage in shorter or longer increments.

The height of resource blocks 602 may represent an extent of computational demand that a given resource block 602 can meet, and as shown in FIG. 6B, in order to meet the peak computational demand from the managed network's web development activity, the managed network may utilize four resource blocks 602 at once. In particular, FIG. 6B shows the managed network using four resource blocks 602 during each hour of the day. However, as noted above and as depicted by computational demand curve 600, the computational demand of the web development services may vary throughout the day and so too may the managed network's need for computing resources.

Figure 6C:
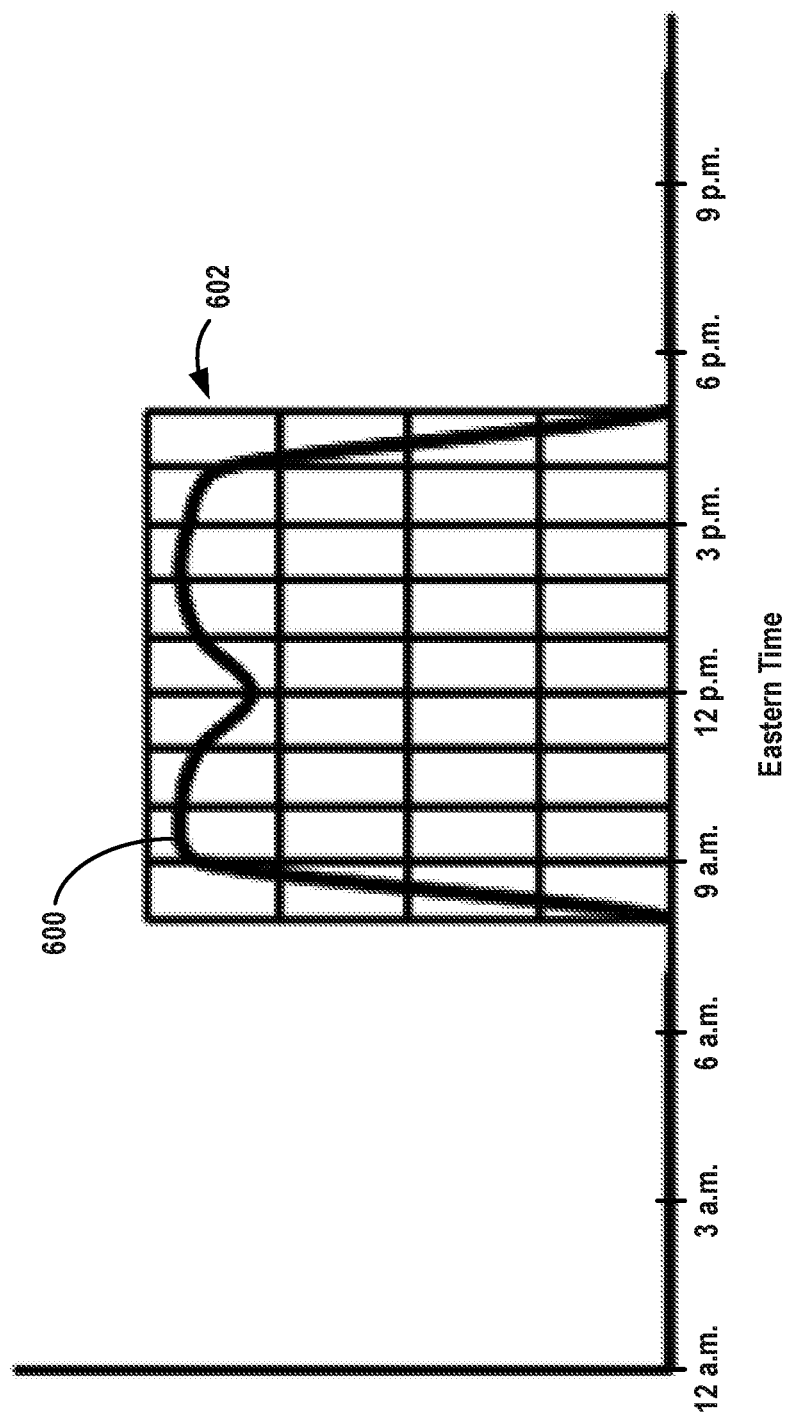
FIG. 6C is the graph of FIG. 6B after improving the distribution of the blocks of computing resources, in accordance with example embodiments.

FIG. 6C depicts a graph showing an improved use of the third-party network's computing resources for meeting the demand of the managed network's web development tasks. Because the web development tasks are only carried out during the managed network's business hours, the managed network only needs to use four resource blocks 602 between 8:00 a.m. and 5:00 p.m. and zero resource blocks 602 during other times. As explained in further detail below, each resource block 602 may be associated with on-demand computing resources that the managed network purchases from the third-party network. Thus, by disabling unnecessary resource blocks 602 (i.e., resource blocks 602 that occur outside of the managed network's business hours), the managed network may reduce the costs of using the third-party network's resources.

While FIG. 6C shows illustrates disabling all of resource blocks 602 that occur outside business hours, in some examples a nominal amount of resource blocks 602 that occur outside business hours may be preserved to account for miscellaneous web development tasks that may occasionally be performed outside business hours. For instance, in a particular example, if four resource blocks 602 are allocated each hour during business hours, then one resource block 602 may be allocated each hour outside of business hours. Other examples are possible as well.

Figure 7A:
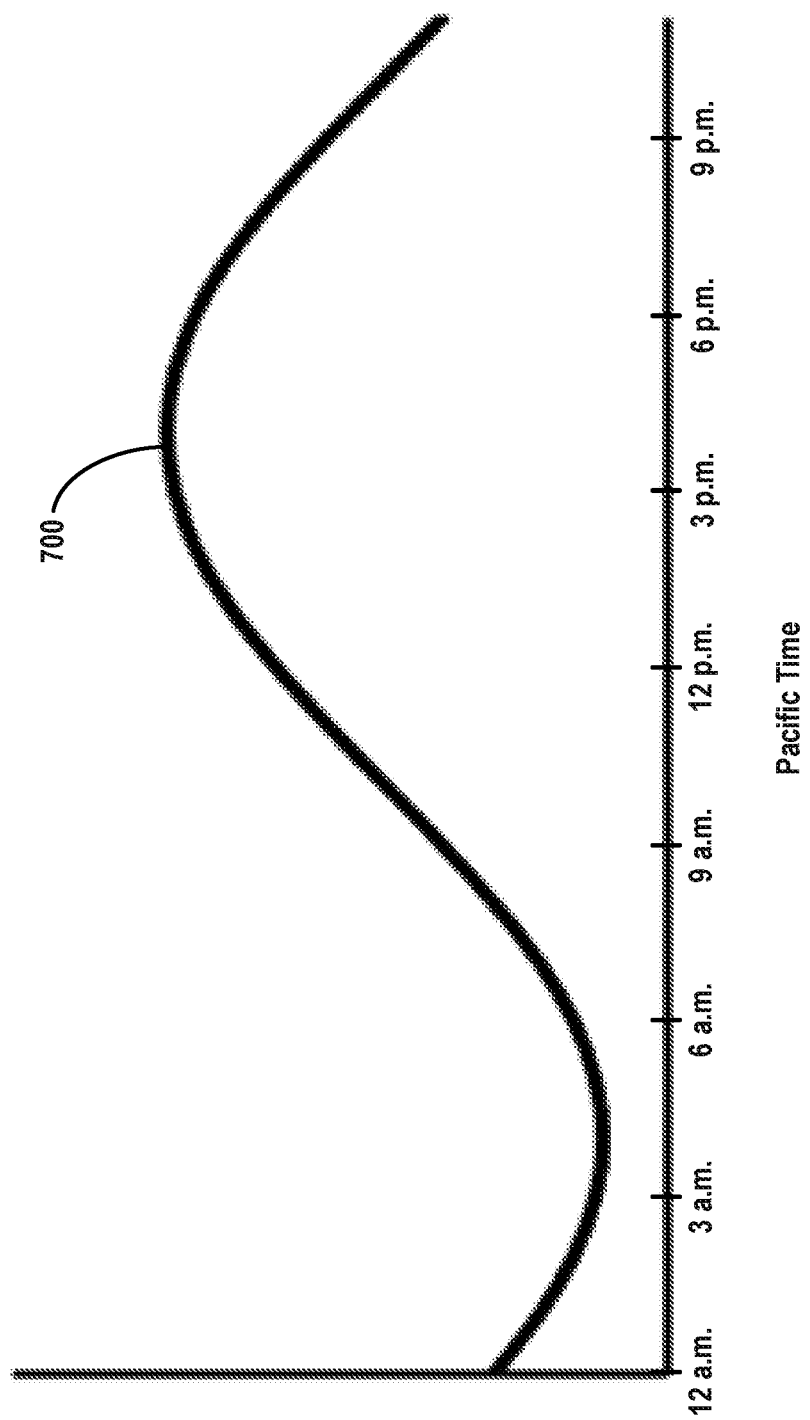
FIG. 7A is a graph depicting computational demand over time for music streaming services, in accordance with example embodiments.

To further illustrate a scenario in which the managed network may desire to reduce its use of the third-party network's resources, FIG. 7A depicts a graph showing a curve 700 representative of a computational demand resulting from the music streaming services for delivering music to various music listeners throughout a given day. Similar to the computational demand for web development tasks, the computational demand for music streaming services may be for various types of computing resources, such as processing power, data storage, or networking services.

The managed network may use a number of the third-party network's servers to deliver music to listeners. For instance, the managed network may use one or more servers in the Pacific Time Zone to deliver music to listeners located in the western half of the United States, and the managed network may use one or more servers in the Eastern Time Zone to deliver music to listeners located in the eastern half of the United States. FIG. 7A depicts the computational demand curve 700 for delivering music to listeners in or near the Pacific Time Zone, so the curve 700 is depicted with respect to times in Pacific Time.

The computational demand curve 700 may generally follow the streaming trends of the music listeners. For instance, the fewest number of listeners may stream music around 4:00 a.m., and the largest number of listeners may stream music around 4:00 p.m., such that the lowest computational demand occurs around 4:00 a.m., and the highest computational demand occurs around 4:00 p.m.

Figure 7B:
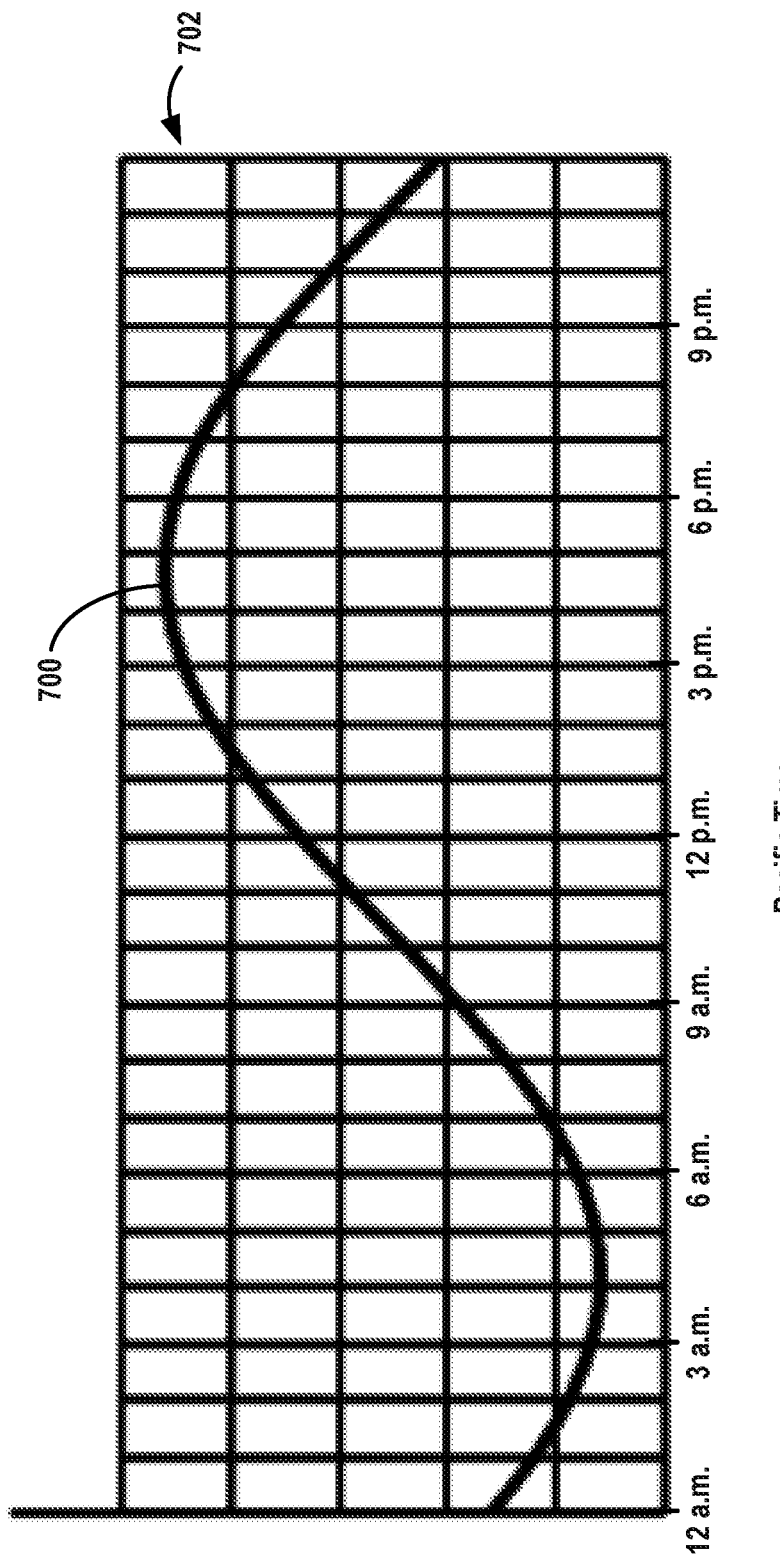
FIG. 7B is the graph of FIG. 7A further depicting blocks of computing resources of a third-party network for carrying out the music streaming services, in accordance with example embodiments.

FIG. 7B depicts a graph showing a number of computing resource blocks 702, each resource block 702 representing particular computing resources provided by the third-party network to the managed network in order to carry out the music streaming services corresponding to computational demand curve 700. In one example, the third-party network's computing resources may include computer processing capabilities, and each resource block 702 may represent use of a particular processor or set of processors of the third-party network. Again, the computational demand of the music streaming services may vary throughout the day and so too may the managed network's need for computing resources to carry out the music streaming services.

Figure 7C:
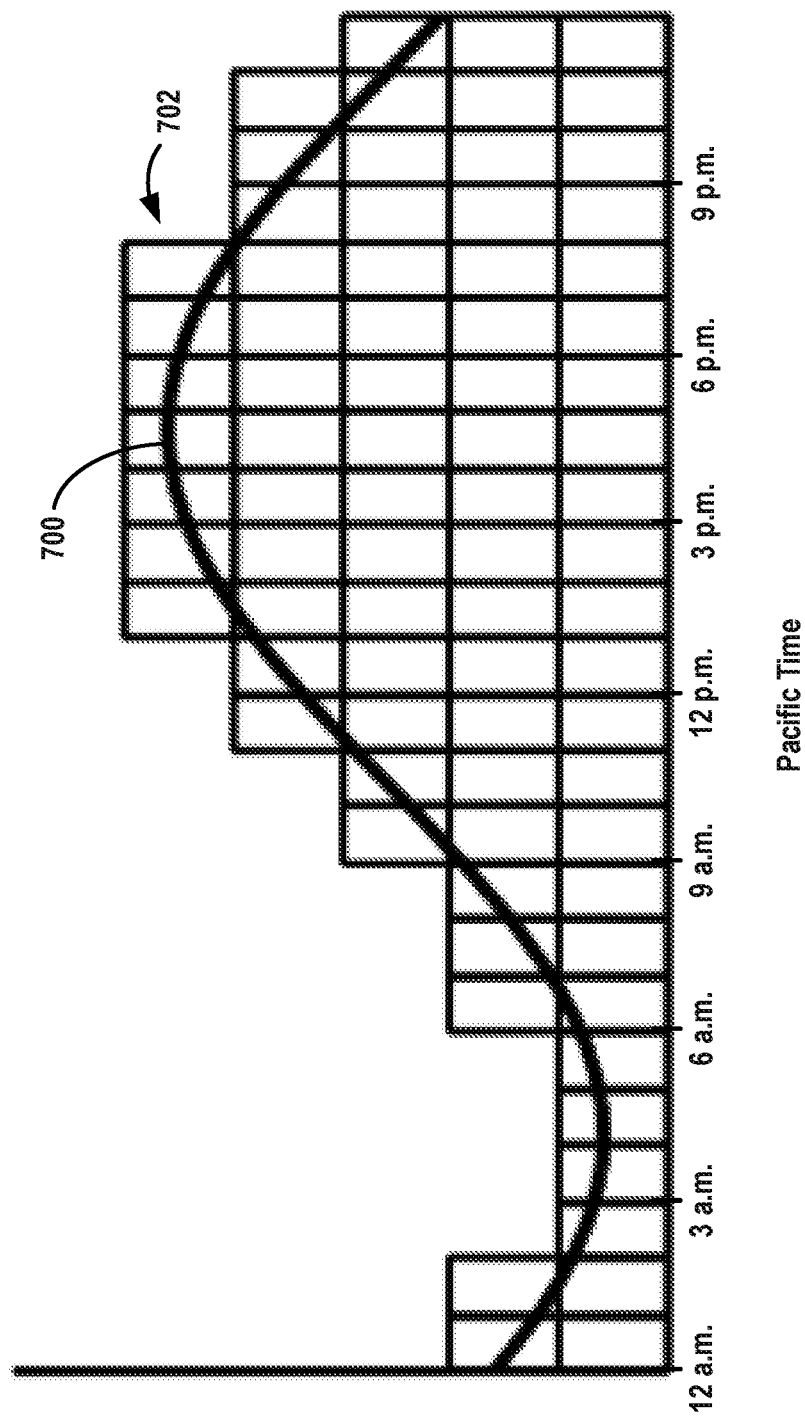
FIG. 7C is the graph of FIG. 7B after improving the distribution of the blocks of computing resources, in accordance with example embodiments.

FIG. 7C depicts a graph showing an improved use of the third-party network's computing resources for meeting the demand of the managed network's music streaming services. In particular, when the number of streaming music listeners and the corresponding computational demand for providing music streaming services decreases, the number of on-demand computing resources 702 purchased and utilized by the managed network is appropriately reduced so that the managed network does not incur costs for unwanted or unnecessary computing resources.

In order to reduce unwanted or unnecessary computing resources, they must first be identified. As noted above, the remote network management platform that manages the managed network can be configured to identify which computing resources of the third-party network are unwanted or unnecessary. In order for the remote network management platform to do so, the remote network management platform may obtain and analyze a utilization report that includes records of the various third-party network computing resources used by the managed network.

FIG. 8 depicts a portion of an example utilization report 800 that corresponds to the computing resource usage depicted in FIGS. 6B and 7B. The third-party network may monitor the managed network's usage of the third-party network's computing resources and generate utilization report 800. Utilization report 800 includes a number of items that each correspond to a particular computing resource used by the managed network. Each item of utilization report 800 includes data related to its corresponding computing resource, such as "Item #" data, "Item Description" data, "Usage Type" data, "Usage Qty" data, "Rate" data, "Cost" data, "Usage Start" data, "Usage End" data, "Region" data, and "Service Type" data. In other examples, each item of utilization report 800 may include more or less data.

The "Item #" data merely serves to assign a numerical identifier to the item so that each item can be identified from among the others. The "Item Description" data includes a brief description of each item. For instance, as shown, the "Item Description" data may indicate whether a computing resource is associated with an hourly usage fee or with a fee that depends on an amount of data transferred. The "Usage Type" data identifies the type of computing resource that the managed network used. For instance, the "Usage Type" data may indicate whether the managed network is using data storage resources, data transfer resources, or data processing resources. For data processing resources, the "Usage Type" data may provide further indication of the amount of processing power used. For instance, the "Usage Type" data may specify "CPU.small" for data processing that uses a small number of processing cores, a small amount of power per core, and/or a small cache memory, and the "Usage Type" data may specify "CPU.large" for data processing that uses a larger number of processing cores, a larger amount of power per core, and/or a larger cache memory. The "Usage Qty" data identifies a quantity of use of a particular computing resource. For resource uses that are measured based on an amount of data, the quantity may indicate a quantity of data used, and for resource uses that are measured based on an amount of time, the quantity may indicate how long the resource was used. The "Rate" data identifies a price rate for using each computing resource. The "Cost" data identifies a total cost for using the computing resources associated with each item and is determined by multiplying the "Rate" data by the "Usage Qty" data. Because utilization report 800 includes cost information for each item, utilization report 800 may also be referred to as a billing report. The "Usage Start" data identifies a start time for each item, the "Usage End" data identifies an end time for each item. The "Usage Start" and "Usage End" data may be formatted according to a single time standard, such as the Coordinated Universal Time (UTC) standard, for uniformity. The "Region" data identifies a physical location of the server of the third-party network that was used to provide the computing resources associated with each item.

Finally, utilization report 800 may include tags to help identify which items were used in connection with particular services. As shown, utilization report 800 includes a tag named "Service Type," and the values of the tag include "Music Streaming" to indicate that the corresponding item is associated with computing resources used for music streaming services, as well as "Web Development" to indicate that the corresponding item is associated with computing resources used for web development services. The names of the tags and their values may be defined by the managed network when enabling use of the computing resources, and the third-party network may then automatically populate utilization report 800 with the appropriate tags.

As noted above, the third-party network may monitor the managed network's resource usage in hourly increments, and so utilization report 800 reports the resource usage in hourly increments as well. Thus, if the managed network uses a particular computing resource for twenty-four hours straight, utilization report 800 will include twenty-four separate items (one for each hour of usage) for reporting the usage of the computing resource.

To illustrate, consider resource blocks 602 and 702 in FIGS. 6B and 7B. In line with the discussion above, resource blocks 602 represent four computing resources concurrently enabled throughout a twenty-four hour day, and resource blocks 702 represent five computing resources concurrently enabled throughout a twenty-four hour day. As such, for each hour of the day, utilization report 800 will include four items corresponding to resource blocks 602 and five items corresponding to resource blocks 702. Indeed, item numbers 140-143 of utilization report 800 correspond to resource blocks 602 that begin at 12:00 p.m. UTC (7:00 a.m. EST), and item numbers 135-139 correspond to resource blocks 702 that begin at 12:00 p.m. UTC (4:00 a.m. PST). Similarly, item numbers 206-209 of utilization report 800 correspond to resource blocks 602 that begin at 6:00 p.m. UTC (1:00 p.m. EST), and item numbers 201-205 correspond to resource blocks 702 that begin at 6:00 p.m. UTC (10:00 a.m. PST).

The remote network management platform may obtain utilization report 800 from the third-party network. As noted above, the remote network management platform may include modules that integrate with the third-party network. A user from the managed network might first establish an account with the third-party network, and the user may enter the account information into the appropriate modules of the remote network management platform. The account information may include access credentials, such as an account username, password, or the like. The modules of the remote network management platform may then use the account information to gain access to the account and automatically discover and obtain utilization report 800 from the third-party network. For instance, the modules of the remote network management platform may query the third-party network for utilization report 800, and the third-party network may respond to the query by providing utilization report 800 to the remote network management platform.

Once the remote network management platform obtains utilization report 800, the remote network management platform may process utilization report 800 to identify any unwanted or unnecessary computing resources that are being utilized by the managed network. In order to do so, the remote network management platform may determine a utilization policy on behalf of the managed network. The utilization policy may identify how various computing resources of the third-party network are permitted to be utilized by the managed network.

Figure 9:
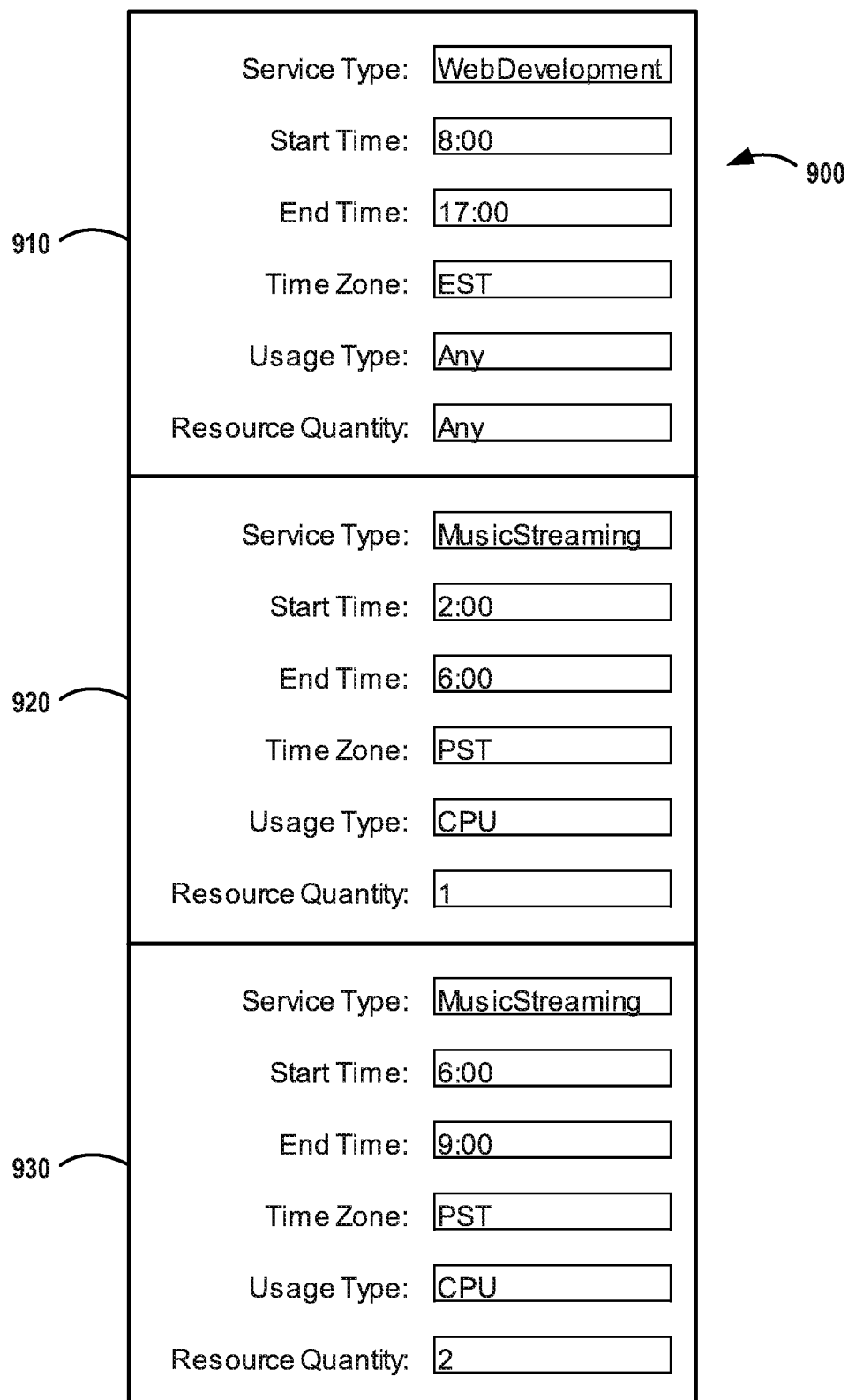
FIG. 9 depicts a third-party network utilization policy, in accordance with example embodiments.

FIG. 9 depicts usage rules of a utilization policy 900. As shown, utilization policy 900 includes first usage rules 910, second usage rules 920, and third usage rules 930, but utilization policy 900 may include additional or fewer sets of usage rules in other examples.

Each set of usage rules of utilization policy 900 may define various rules for determining which computing resources are permitted to be utilized by the managed network. For instance, each set of usage rules may define a "Service Type," which may indicate a type of service for which particular computing resources are used. Each set of usage rules may also define a "Start Time," an "End Time," and a "Time Zone." The "Start Time" and "End Time" may define the start and end of a time period during which particular computing resources are permitted to be used. The "Time Zone" may serve two purposes. First, it may specify the time zone in which the start and end times are defined. And second, the "Time Zone" may limit a particular set of usage rules only to servers located in the specified time zone. For instance, because usage rules 910 specify the "EST" time zone, usage rules 910 may only be applied to servers located in the Eastern Time Zone of the United States. Next, the "Usage Type" may specify that the usage rules are to apply only to computing resources of a particular usage type, which is identified in utilization report 800, as described above. Finally, the "Resource Quantity" may define a nominal or maximum quantity of a particular computing resource that is permitted to be used during the specified time period.

In practice, a user of the managed network may define the various usage rules in utilization policy 900 based on one or more operational characteristics of the managed network. For instance, as described above, the managed network may only perform web development services during normal business hours. Accordingly, the user of the managed network may specify usage rules of utilization policy 900 that permit web development computing resources to only be used during the business hours. Similarly, as described above, the managed network's need for computing resources for music streaming may consistently vary throughout the day based on the number of music listeners streaming music from the managed network. Accordingly, the user of the managed network may specify usage rules of utilization policy 900 that limit the maximum number of music streaming computing resources during time periods when the number of music listeners is low.

To illustrate how utilization policy 900 may be used to identify unwanted or unnecessary usage of the third-party network's computing resources, first consider the first set of usage rules 910. As shown, the first set of usage rules 910 specifies that web development computing resources are permitted to be used on servers in the Eastern Time Zone between the hours of 8:00 a.m. and 5:00 p.m. Eastern Time. Further, web development resources of any usage type and in any quantity may be used during the specified time period.

When presented with the first set of usage rules 910, the remote network management platform may analyze utilization report 800 to identify which computing resources comply with the first set of usage rules 910 and which computing resources do not comply with the first set of usage rules 910. For instance, because the first set of usage rules 910 only applies to web development computing resources, the remote network management platform may first scan utilization report 800 to identify all items that include a "Service Type" of "Web Development." Referring to FIG. 8, the remote network management platform may identify item numbers 140-143 and 206-209 as web development computing resources.

Next, the remote network management platform may determine which ones of the identified web development resources were used outside the time period specified in the first set of usage rules 910 and which ones of the identified web development resources were used within the time period specified in the first set of usage rules 910. Because utilization report 800 identifies usage times in UTC time, the remote network management platform may convert the time period into UTC time. In the present example, the time period of 8:00 a.m. to 5:00 p.m. EST converts to 13:00 to 22:00 UTC. The remote network management platform may then determine which ones of the identified resources have a "Usage Start" or "Usage End" time that falls outside the specified time period and which ones of the identified resources have a "Usage Start" or "Usage End" time that falls within the specified time period. Referring to FIG. 8, the remote network management platform may determine that item numbers 140-143 were used outside the specified time period, while item numbers 206-209 were used within the specified time period.

Finally, the remote network management platform may determine which computing resources were provided by a server that is located within the time zone specified by the first set of usage rules 910. Because utilization report 800 specifies the "Region" for item numbers 140-143 and 206-209 as "us-east," the remote network management platform may determine that the server that provided these resources is located in the Eastern Time Zone, as required by the first set of usage rules 910. The remote network management platform does not need to analyze utilization report 800 any further because the first set of usage rules 910 is specified to apply to all "Usage Types" and to allow any quantity of computing resources to be used during the time period.

Accordingly, upon determining that item numbers 140-143 correspond to web development computing resources deployed by a server in the Eastern Time Zone outside the permissible time period, the remote network management platform may determine that item numbers 140-143 do not comply with the first set of usage rules 910. Conversely, upon determining that item numbers 206-209 correspond to web development computing resources deployed by a server in the Eastern Time Zone within the permissible time period, the remote network management platform may determine that item numbers 206-299 do comply with the first set of usage rules 910.

Next, consider the second set of usage rules 920. As shown, the second set of usage rules 920 specifies that music streaming computing resources are permitted to be used on servers in the Pacific Time Zone between the hours of 2:00 a.m. and 6:00 a.m. Pacific Time. Further, within that specified time period, a maximum number of one computing resource with a "CPU" usage type may be used.

When presented with the second set of usage rules 920, the remote network management platform may analyze utilization report 800 to identify which computing resources comply with the second set of usage rules 920 and which computing resources do not comply with the second set of usage rules 920. For instance, because the second set of usage rules 920 only applies to music streaming computing resources, the remote network management platform may first scan utilization report 800 to identify all items that include a "Service Type" of "Music Streaming." Referring to FIG. 8, the remote network management platform may identify item numbers 133-139 and 199-205 as music streaming computing resources.

Next, the remote network management platform may determine which ones of the identified music streaming resources were used outside the time period specified in the second set of usage rules 920 and which ones of the identified music streaming resources were used within the time period specified in the second set of usage rules 920. Again, because utilization report 800 identifies usage times in UTC time, the remote network management platform may convert the time period into UTC time. In the present example, the time period of 2:00 a.m. to 6:00 a.m. PST converts to 10:00 to 14:00 UTC. The remote network management platform may then determine which ones of the identified resources have a "Usage Start" or "Usage End" time that falls outside the specified time period and which ones of the identified resources have a "Usage Start" or "Usage End" time that falls within the specified time period. Referring to FIG. 8, the remote network management platform may determine that item numbers 133-139 were used within the specified time period, while item numbers 199-205 were used outside the specified time period.

Next, the remote network management platform may determine which computing resources were provided by a server that is located within the time zone specified by the second set of usage rules 920. Because utilization report 800 specifies the "Region" for item numbers 133-139 and 199-205 as "us-west," the remote network management platform may determine that the server that provided these resources is located in the Pacific Time Zone, as required by the second set of usage rules 920.

Finally, the remote network management platform may determine which of the music streaming computing resources comply with the "Usage Type" and "Resource Quantity" specified by the second set of usage rules 920 and which resources do not comply. As shown, the second set of usage rules 920 specifies that only one CPU computing resource is permitted to be used for music streaming services during each hour of the specified time period. Referring to FIG. 8, the remote network management platform may determine from utilization report 800 that five CPU computing resources are used for music streaming services during a particular hour of the specified time period. In particular, the remote network management platform may determine that item numbers 135-139 correspond to CPU computing resources because they each have a "Usage Type" that indicates a type of CPU usage, and the remote network management platform may determine that all five of item numbers 135-139 were used concurrently during the same hour of the specified time period because their "Usage Start" and "Usage End" times indicate that each resource was used between 12:00 and 13:00 UTC (4:00 a.m. and 5:00 a.m. PST). Because the second set of usage rules 920 specifies that only one CPU resource is permitted to be used per hour during this time, the remote network management platform may determine that one of the items (e.g., item number 135) complies with the second set of usage rules 920, while the remaining items (e.g., item numbers 136-139) do not comply.

The remote network management platform may continue to apply additional usage rules specified by utilization policy 900 to determine whether each item of utilization report 800 complies with utilization policy 900. If any particular item of utilization report 800 complies with any set of usage rules of utilization policy 900, then that particular item may be deemed to comply with utilization policy 900. Conversely, if any particular item of utilization report 800 fails to comply with any set of usage rules of utilization policy 900, then that particular item may be deemed to not comply with utilization policy 900.

Once the remote network management platform has identified which items of utilization report 800 comply with utilization policy 900 and which do not, the remote network management platform may generate a report indicating which items of utilization report 800 comply with utilization policy 900 and which do not. The report may take various forms. For instance, the report may include utilization report 800 with added markers indicating the compliant and/or non-compliant items. For instance, compliant items may be highlighted in one color, and non-compliant items may be highlighted in another color. In some examples, the report may indicate a total monetary cost of the non-compliant resources and/or an estimated cost savings that would result from causing the managed network to stop using the non-compliant resources. For instance, the remote network management platform may determine the cost and/or the estimated cost savings by summing together the "Cost" data in utilization report 800 for each item that was determined to be non-compliant with utilization policy 900.

In the above examples, utilization policy 900 specifies rules that indicate how various computing resources can be permissibly used. However, in some examples, utilization policy 900 may specify rules that indicate how various computing resources are prohibited from being used. For example, instead of specifying the time period when a resource can be used, utilization policy 900 may specify a time period when the resource should not be used. The remote network management platform may then determine that an item of utilization report 800 does not comply with utilization policy 900 if the item corresponds to computing resources that were used during the specified time period.

In some examples, the remote network management platform may take steps to cause the managed network to stop using the computing resources associated with non-compliant items. For instance, in response to identifying the non-compliant items, the remote network management platform may use the managed network's access credentials to access the managed network's account with the third-party network. The remote network management platform may then query the third-party network with an instruction to disable services corresponding to the non-compliant items, and the third-party network may responsively disable the services.

After disabling services corresponding to non-compliant items, the remote network management platform may further be configured to re-enable the services to account for subsequent increased computational demands. For instance, with respect to the web development computing resources described above, utilization policy 900 specifies that any web development computing resources should be disabled starting at 5:00 p.m., and so the remote network management platform may cause those resources to be disabled starting at 5:00 p.m. And because utilization policy 900 also specifies that any web development computing resources should be permitted starting at 8:00 a.m., the remote network management platform may cause the resources that it previously disabled at 5:00 p.m. to be re-enabled at 8:00 a.m. the next morning. The remote network management platform may similarly re-enable computing resources used for music streaming according to the nominal number of resources specified by utilization policy 900. For instance, after disabling music streaming resources during a particular time period specified by utilization policy 900, the remote network management platform may re-enable one or more of the disabled resources during a subsequent time period such that the quantity of enabled resources during the subsequent time period matches the nominal quantity specified for the subsequent time period by utilization policy 900.

VI. EXAMPLE OPERATIONS

Figure 10:
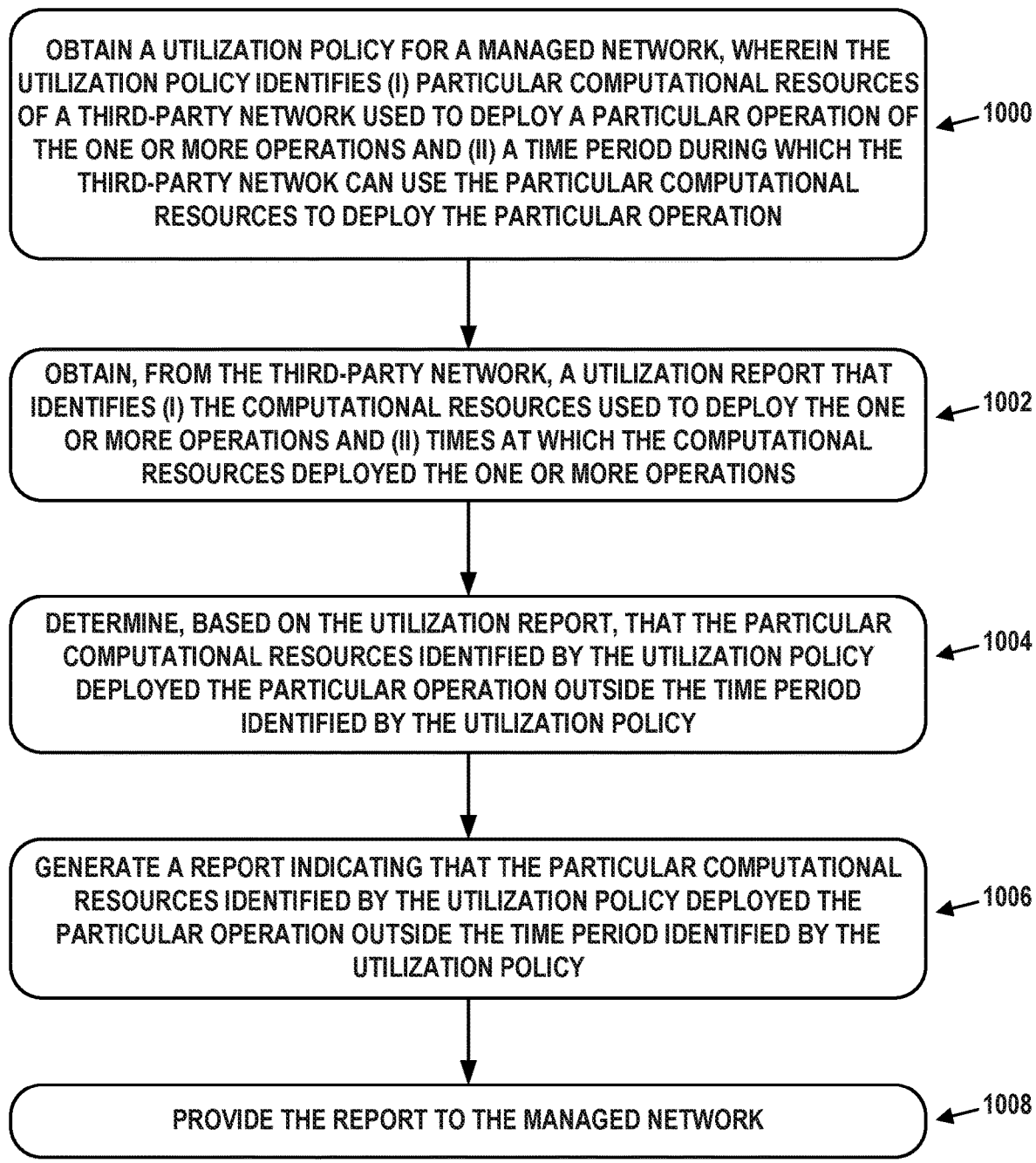
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve a computing system obtaining a utilization policy for a managed network. The computing system may be disposed within a computational instance of a remote network management platform and may remotely manage the managed network. The managed network may use a third-party network to deploy one or more operations using computational resources of the third-party network. The utilization policy identifies (i) particular computational resources of the third-party network used to deploy a particular operation of the one or more operations and (ii) a time period during which the third-party network can use the particular computational resources to deploy the particular operation.

Block 1002 may involve the computing system obtaining, from the third-party network, a utilization report that identifies (i) the computational resources used to deploy the one or more operations and (ii) times at which the computational resources deployed the one or more operations.

Block 1004 may involve the computing system determining based on the utilization report, that the particular computational resources identified by the utilization policy deployed the particular operation outside the time period identified by the utilization policy.

Block 1006 may involve the computing system generating a report indicating that the particular computational resources identified by the utilization policy deployed the particular operation outside the time period identified by the utilization policy.

Some embodiments may further involve the computing system causing the managed network to stop using the particular computational resources in response to determining that the particular computational resources identified by the utilization policy deployed the particular operation outside the time period identified by the utilization policy. These embodiments may further involve, after causing the managed network to stop using the particular computational resources outside the time period identified by the utilization policy, the computing system causing the managed network to start using the particular computational resources during the time period identified by the utilization policy.

In some embodiments, the utilization policy further identifies a nominal quantity of the particular computing resources that can be used during the identified time period. These embodiments may further involve the computing system determining, based on the utilization report, that the nominal quantity of the particular computing resources that can be used during the identified time period has been exceeded. In these embodiments, the generated report may further indicate that the nominal quantity of the particular computing resources that can be used during the identified time period has been exceeded.

In some embodiments, obtaining the utilization policy for the managed network involves the computing system receiving, from the managed network, data that identifies (i) the particular computational resources of the third-party network used to deploy the particular operation of the one or more operations and (ii) the time period during which the third-party network can use the particular computational resources to deploy the particular operation.

In some embodiments, obtaining the utilization report involves the computing system (i) receiving, from the managed network, access credentials for accessing an account of the managed network with the third-party network, (ii) using the access credentials to query the third-party network for the utilization report, and (iii) responsive to querying the third-party network for the utilization report, receiving the utilization report from the third-party network.

In some embodiments, the utilization report further identifies a cost of the particular computational resources. These embodiments may further involve the computing system determining an estimated cost savings that would result from causing the managed network to stop using the particular computational resources. In these embodiments, the generated report may further indicate the determined estimated cost savings.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising a computational instance of a remote network management platform that remotely manages a managed network, wherein the managed network uses a third-party network to deploy one or more operations using computational resources of the third-party network, the computing system being configured to:
   obtain a utilization policy for the managed network, wherein the utilization policy identifies (i) particular computational resources of the third-party network used to deploy a particular operation of the one or more operations and (ii) a time period during which the third-party network can use the particular computational resources to deploy the particular operation;
   obtain, from the third-party network, a utilization report that identifies (i) the computational resources used to deploy the one or more operations and (ii) times at which the computational resources deployed the one or more operations;
   determine, based on the utilization report, that the particular computational resources identified by the utilization policy deployed the particular operation outside the time period identified by the utilization policy;
   generate a report indicating that the particular computational resources identified by the utilization policy deployed the particular operation outside the time period identified by the utilization policy; and
   provide the report to the managed network.

2. The computing system of claim 1, wherein the computing system is configured to:
   in response to determining that the particular computational resources identified by the utilization policy deployed the particular operation outside the time period identified by the utilization policy, cause the managed network to stop using the particular computational resources outside the time period identified by the utilization policy.

3. The computing system of claim 2, wherein the computing system is configured to:
   after causing the managed network to stop using the particular computational resources outside the time period identified by the utilization policy, cause the managed network to start using the particular computational resources during the time period identified by the utilization policy.

4. The computing system of claim 1, wherein the utilization policy identifies a nominal quantity of the particular computing resources that can be used during the identified time period, and wherein the computing system is configured to:
   determine, based on the utilization report, that the nominal quantity of the particular computing resources that can be used during the identified time period has been exceeded.

5. The computing system of claim 4, wherein the generated report indicates that the nominal quantity of the particular computing resources that can be used during the identified time period has been exceeded.

6. The computing system of claim 1, wherein obtaining the utilization policy for the managed network comprises receiving, from the managed network, data that identifies (i) the particular computational resources of the third-party network used to deploy the particular operation of the one or more operations and (ii) the time period during which the third-party network can use the particular computational resources to deploy the particular operation.

7. The computing system of claim 1, wherein obtaining the utilization report comprises:
receiving, from the managed network, access credentials for accessing an account of the managed network with the third-party network;
using the access credentials to query the third-party network for the utilization report; and
responsive to querying the third-party network for the utilization report, receiving the utilization report from the third-party network.

8. The computing system of claim 1, wherein the computing system is configured to:
based on a cost of the particular computational resources identified in the utilization report, determine an estimated cost savings that would result from causing the managed network to stop using the particular computational resources, wherein the generated report indicates the determined estimated cost savings.

9. The computing system of claim 1, wherein the time period depends on a physical location of a server of the third-party network on which the particular computational resources are used to deploy the particular operation.

10. A method for use in connection with a computing system comprising a computational instance of a remote network management platform that remotely manages a managed network, wherein the managed network uses a third-party network to deploy one or more operations using computational resources of the third-party network, the method comprising:
obtaining, by the computing system, a utilization policy for the managed network, wherein the utilization policy identifies (i) particular computational resources of the third-party network used to deploy a particular operation of the one or more operations and (ii) a time period during which the third-party network can use the particular computational resources to deploy the particular operation;
obtaining, by the computing system and from the third-party network, a utilization report that identifies (i) the computational resources used to deploy the one or more operations and (ii) times at which the computational resources deployed the one or more operations;
determining, by the computing system, based on the utilization report, that the particular computational resources identified by the utilization policy deployed the particular operation outside the time period identified by the utilization policy;
generating, by the computing system, a report indicating that the particular computational resources identified by the utilization policy deployed the particular operation outside the time period identified by the utilization policy; and
providing, by the computing system, the report to the managed network.

11. The method of claim 10, comprising:
causing, by the computing system, the managed network to stop using the particular computational resources in response to determining that the particular computational resources identified by the utilization policy deployed the particular operation outside the time period identified by the utilization policy.

12. The method of claim 11, comprising:
after causing the managed network to stop using the particular computational resources outside the time period identified by the utilization policy, causing, by the computing system, the managed network to start using the particular computational resources during the time period identified by the utilization policy.

13. The method of claim 10, wherein the utilization policy identifies a nominal quantity of the particular computing resources that can be used during the identified time period, and wherein the method comprises:
determining, based on the utilization report, that the nominal quantity of the particular computing resources that can be used during the identified time period has been exceeded.

14. The method of claim 13, wherein the generated report indicates that the nominal quantity of the particular computing resources that can be used during the identified time period has been exceeded.

15. The method of claim 10, wherein obtaining the utilization policy for the managed network comprises receiving, from the managed network, data that identifies (i) the particular computational resources of the third-party network used to deploy the particular operation of the one or more operations and (ii) the time period during which the third-party network can use the particular computational resources to deploy the particular operation.

16. The method of claim 10, wherein obtaining the utilization report comprises:
receiving, by the computing system from the managed network, access credentials for accessing an account of the managed network with the third-party network;
using, by the computing system, the access credentials to query the third-party network for the utilization report; and
responsive to querying the third-party network for the utilization report, receiving, by the computing system, the utilization report from the third-party network.

17. The method of claim 10, comprising:
based on a cost of the particular computational resources identified in the utilization report, determining, by the computing system, an estimated cost savings that would result from causing the managed network to stop using the particular computational resources, wherein the generated report indicates the determined estimated cost savings.

18. An article of manufacture including a non-transitory computer-readable medium having stored thereon program instructions that, upon execution by a computing system, cause the computing system to perform operations, wherein the computing system comprises a computational instance of a remote network management platform that remotely manages a managed network, wherein the managed network uses a third-party network to deploy one or more operations using computational resources of the third-party network, and wherein the operations comprise:
obtaining a utilization policy for the managed network, wherein the utilization policy identifies (i) particular computational resources of the third-party network used to deploy a particular operation of the one or more operations and (ii) a time period during which the third-party network can use the particular computational resources to deploy the particular operation;
obtaining, from the third-party network, a utilization report that identifies (i) the computational resources used to deploy the one or more operations and (ii) times at which the computational resources deployed the one or more operations;
determining, based on the utilization report, that the particular computational resources identified by the utilization policy deployed the particular operation outside the time period identified by the utilization policy;

generating a report indicating that the particular computational resources identified by the utilization policy deployed the particular operation outside the time period identified by the utilization policy; and providing the report to the managed network.

19. The computing system of claim 1, wherein the remote network management platform is configured to use the managed network's access credentials to access the managed network's account with the third-party network and query the third-party network to disable particular computational resources that deployed particular operations outside of the time period identified by the utilization policy.

20. The computing system of claim 1, wherein the utilization policy is configured to identify the time period when particular computational resources cannot be used.

* * * * *